April 11, 1950   F. R. GOOD   2,503,550
AUTOMOBILE MAP HOLDER
Filed Dec. 6, 1947   2 Sheets-Sheet 2
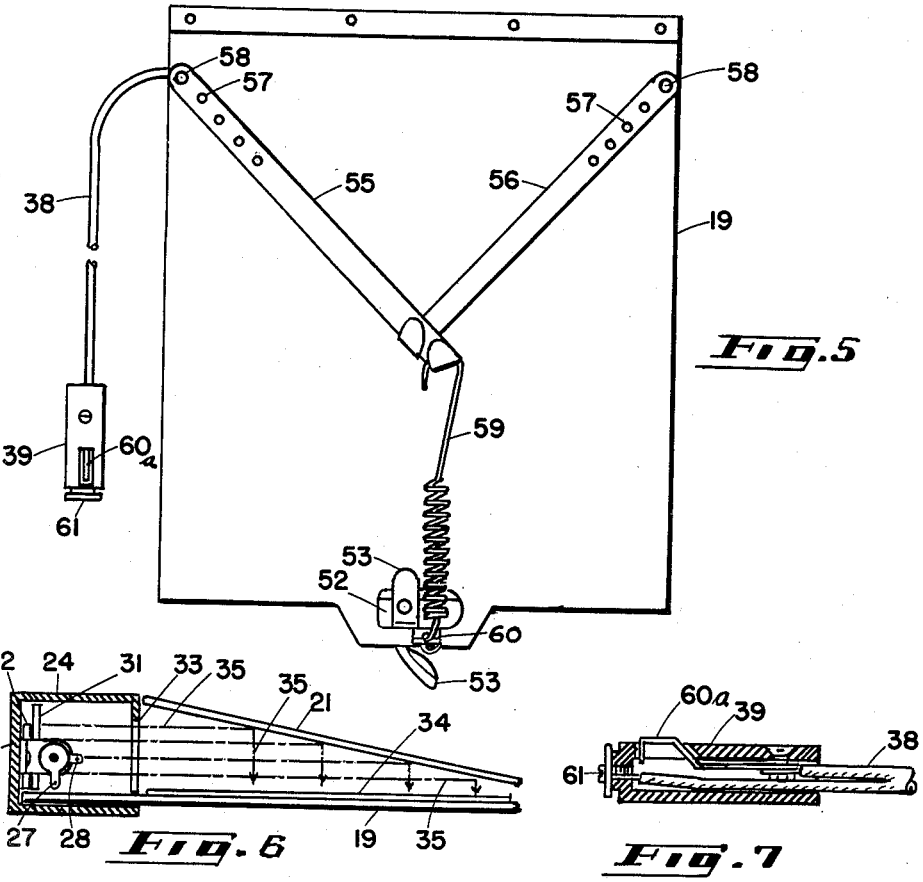
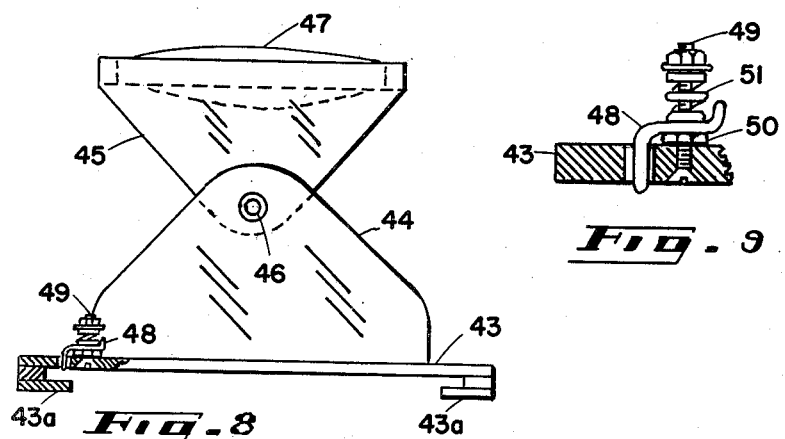
INVENTOR.
FRANCIS R. GOOD
BY Thomas Appleby
his attorney.

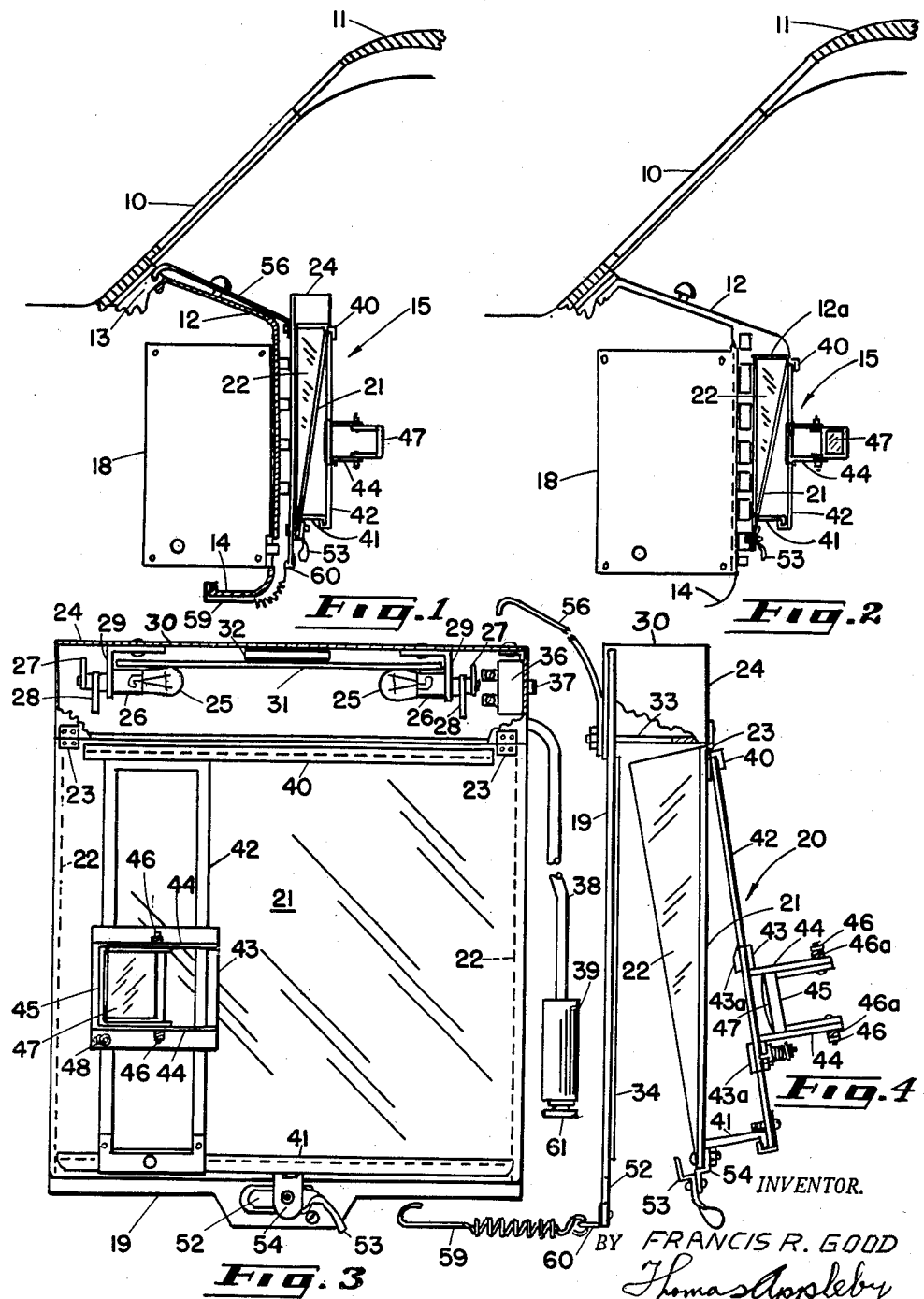

Patented Apr. 11, 1950

2,503,550

UNITED STATES PATENT OFFICE 2,503,550

AUTOMOBILE MAP HOLDER

Francis R. Good, Long Beach, Calif.

Application December 6, 1947, Serial No. 790,209

2 Claims. (Cl. 40—130)

1

This invention relates to portable automobile map holders, and more particularly to such holders as may include illuminating and magnifying means, adapted to be temporarily secured to the dash panel of an automobile in a convenient position in full view of the operator when in use without recourse to the use of tools or drilling or otherwise defacement of the dash panel for attachment thereto and which may be readily removed and stored in a suitable compartment or conveniently placed on the seat alongside the operator by folding and securing its supporting members into compact locked form for stowage.

This invention is particularly useful for tourists, doctors, messengers, and others who drive automobiles in strange territory and especially when driving at night.

An object of this invention is to provide a portable map holder which may be readily applied to and supported by the dash panel of an automobile, readily removed therefrom when not required, and permit placing therein a map or other sheet of directions under a protecting cover free from displacement by curling or from drafts.

Another object is to provide a map holder that includes means to suitably illuminate the entire reading surface of the map so that it may be readily observed when used during hours of darkness.

Another object is to provide a transparent reflector through which a map is observed and at the same time adapted to reflect light from a suitable source to the face of the said map.

A further object is to provide a map holder that includes suitable magnifying means adapted to scan the entire reading surface of the map in said holder and angularly adjustable with respect to the eyes of the operator so that he may readily observe an enlargement of the map while the vehicle is in motion without recourse to shifting from his normal driving position or unduly distracting his attention from the important task of observing the roadway ahead.

A still further object is to provide a map holder that is simple in construction, inexpensive to manufacture, and extremely efficient in use and service.

Other objects of this invention consist in certain other features of construction and in the combination and arrangement of the several parts, to be hereinafter fully described, illustrated in the accompanying drawings and specifically pointed out in the appended claims.

In describing the invention in detail, reference will be had to the accompanying drawings in which:

Figure 1 is an end elevation of the map holder as supported by the dash panel of an automobile, Figure 2 is a modification of Figure 1 showing slightly different means of support, Figure 3 is a front plan view, partly in section, of the map holder, Figure 4 is an end view of the map holder and supporting members with the cover member partially raised, Figure 5 is a view of the back of the map holder showing the supporting members in locked stowage position, Figure 6 is a sectional end view of the map holder indicating the direction and reflection of the light rays from the light source to the face of the map, Figure 7 is a longitudinal sectional view of the electrical contact plug for furnishing current from the vehicle wiring system to the illumination source in the map holder, Figure 8 is a side elevation of the magnifying lens, moveable lens holder and slideable supporting bracket with a friction applying device and sliding bracket retaining foot partly in section, and Figure 9 is an enlarged sectional view of the device for applying friction between the sliding bracket and the coacting guides to retain the lens assembly in any pre-selected position.

As shown in Figure 1, a fragmentary portion of the windshield 10, top 11, and dash panel 12 having a ventilating recess 13 and underturned portion 14, portably supports the map holder generally indicated as 15, by means of upper brackets 55 (Figure 5) and 56, shown hooked over the edge of the ventilating recess housing 13, and the lower stabilizing spring hook 59 shown hooked around the underturned portion 14 of the dash panel 12 in proximity to but without interference with the radio 18. The map holder 15 situated in front of the loud speaker of radio 18 acts as a baffle for the sound and in no way restricts or impairs the sound emitted by the radio.

In Figure 2 is shown a modification wherein the map holder 15 may be secured in a recess 12a of the dash panel 12 in cases where provision for same is made in the dash panel. In this arrangement the compartment 24 may be dispensed with and the illumination provided from under the dash panel.

As shown in Figures 3 and 4, the map holder 15 consists in part of a back plate or base 19, and a front hinged assembly or cover generally designated as 20 which may be raised whenever a map 34 is to be placed on the inside surface of the base 19 or removed therefrom. The hinged assembly consists in part of a transparent front plate 21 normally angularly disposed with respect to the map 34, and transparent side pieces 22 forming an enclosure or lid operating on a pair of hinges 23 secured at its upper end to an illumination source compartment 24. This compartment is arranged to enclose a light source 25 adapted to illuminate the map 34 without unduly lighting external surroundings and shielded from the eyes of the driver so as not to interfere with his ability to properly see the road while driving at night.

Within compartment 24 are mounted lamps 25 in suitable sockets 26 having electrical terminals 27 and 28, and supported by means of brackets 29.

Suitably positioned between the back wall 30 of compartment 24 and the illuminating lamps 25 is a reflector 31 affixed to support 32 for the purpose of reflecting the light rays from lamps 25 through the opening in the front wall 33 to the inside surface of inclined transparent front plate 21 which then reflects the light rays down on to the upper surface of the map 34 as indicated in Figure 6 by dot and dash and arrow terminated lines 35. A suitable switch 36 controls the lighting of lamps 25 by means of push or toggle button 37 in the lamp circuit connected to the vehicle electrical system by means of flexible conductor 38 and terminal plug 39.

Suitably mounted on inclined transparent plate 21 are two parallel guides or rails 40 and 41 extending across the front plate 21. In order to maintain the same relative height above the map 34 one of the guides 41 has a longer supporting foot or standard than the other to properly compensate for the angular position of front plate 21 with respect to map 34 and thus permit lens 47 to maintain a substantially uniform distance from map 34 as the lens is moved across the face of the map. Guides 40 and 41 are adapted to support and permit bracket 42 to slide horizontally across the face of plate 21. Bracket 42 is provided with a large rectangular center opening to permit a substantially unobstructed view of the map 34 between its side members or guides which support bracket 43.

Slidably engaging the side members of bracket 42 is a lens holder supporting bracket comprising base 43 (Figure 8) provided with shoes 43a and having two perpendicular side plates 44 spaced sufficiently apart to support a movable lens holder 45 for partial rotation on pins 46. These pins also support spiral springs 46a which add necessary friction to the hinge of the lens holder 45 to retain it in suitable angular position against gravity and vibration. A suitable lens 47 is mounted in the lens holder 45. It will be readily understood that bracket 42 may be moved horizontally across the front of the map 34 while bracket 43 together with lens holder 45 and lens 47 may be moved vertically across the map and thus permit scanning of the entire reading surface of the map 34. The lens holder 45 may be rotated on supporting pins 46 to tilt it to any suitable position convenient to the eyes of the observer, thus any portion of the entire reading surface of the map 34 may be viewed in magnified form without necessitating the observer to assume a position directly in front of the map. When not in use the lens holder 45 and lens 47 may be conveniently rotated to a downward protected position as indicated in Figure 4.

Suitable tension may be placed on the lens supporting bracket base 43 to prevent any undesired motion and permit its retention in any desired position under adverse conditions of gravity or vibration, such as occur while driving, by means of a retaining brake shoe 48 (Figures 8 and 9) slidably mounted and spring tensioned on a screw 49 between the nut 50 and spiral spring 51, and having one end protruding through a hole in base 43 to permit contact of the shoe 48 with one of the side guides or rails of bracket 42 with suitable pressure to add the necessary friction thereto.

An elongated lock hole 52 is provided in back plate 19 near the center along its lower edge to permit thumb operated lock lever 53, which is rotatably secured by means of a bracket 54 to the cover 20, to pass through and engage the back of back plate 19 in locking position.

In Figure 5 are shown the moveable arms 55 and 56 each provided with a plurality of pivot holes 57 to modify their length as desired when operating on pivots 58 in the upper portion of the back plate 19 for securing the upper end of the map holder 20 to the ventilator housing 13 (Figure 1). A spring hook 59 is secured by means of bracket 60 to the bottom edge of back plate 19 near the center for the purpose of engaging the underturned lower edge 14 of the dash panel 12 (Figure 1) and thus portably secure the map holder 20 in operating position. For purposes of stowage the arms 55 and 56 may be folded back and hooked together and spring hook 59 introduced under tension in the remaining hook on one of the arms, thus applying sufficient tension to retain all three members in stowage position.

Terminal plug 39 (Figure 7) comprises a cylindrical sheath of insulating material to the inside of which is secured a contact spring 60a whose free end projects through a hole in the side of the sheath and is adapted to engage a coacting contact in a socket in the current supply system of the vehicle. A contact stud 61 is threaded into the solid end of the sheath and adapted to engage a coacting contact in the vehicles socket, and a two conductor cable 38 has one of its conductors connected to spring 60a and the other conductor to stud 61. The opposite end of cable 38 is connected to switch 36 and lamps 25 completing the circuit.

From the foregoing description and the disclosure in the drawings it will be obvious that installation of the map holder of this invention may be readily made by anyone without recourse to the use of tools or defacement of any part of the vehicle on which it is used and that it may be readily inserted in place or removed as desired in a moment or two without utilizing the services of a mechanic or other skilled expert, it will therefore require a minimum investment and thus have a maximum use appeal.

It is to be understood that various modifications and changes may be made in this invention without departing from the spirit and scope thereof as set forth in the appended claims.

What is claimed is:

1. A portable map holder comprising a back or base portion on which a map may be placed, a cover portion having a front plate of transparent material angularly positioned with respect to said base and through which said map may be viewed, a compartment containing a reflector and a light source adapted to permit the light rays from said source reflected by said reflector to impinge upon the inner surface of said front plate and thereby be reflected to the surface of said map, a pair of guides secured respectively longitudinally adjacent the upper and lower edge of said front plate, a bracket supported by and sliding in said longitudinal guides horizontally across the face of said map and having a pair of vertically disposed parallel guides, a lens holder bracket supported by and sliding in said vertically disposed guides from top to bottom across the face of said map, a hinged lens holder and a lens supported by said lens holder bracket for scanning and magnifying any portion of the face of said map and tiltable to any suitable angle with respect to the viewing position of the eyes of the observer, and spring actuated means for applying suitable friction to said lens holder bracket and to said lens holder to substantially prevent their positions shifting due to vibration or gravity.

2. The combination, in a map holder, of a back or base portion on which a map may be placed, a hinged cover portion having side members for holding said map in position and having a front plate of transparent material angularly positioned with respect to said base through which said map may be viewed, a reflector, an electric light adapted to permit its light rays reflected by said reflector to impinge upon the inner surface of said transparent plate and be thereby reflected to the surface of and illuminate said map, a pair of guides secured respectively longitudinally adjacent the upper and lower edge of said front plate, a bracket supported by and sliding in said longitudinal guides horizontally across the face of said map and having a pair of vertically disposed parallel guides, a lens holder bracket supported by and sliding in said vertically disposed guides from top to bottom across the face of said map, a hinged lens holder and a lens supported by said lens holder bracket for scanning and magnifying any portion of the face of said map and tiltable to any suitable angle with respect to the viewing position of the eyes of the observer, spring actuated means for applying suitable friction to said lens holder bracket and to said lens holder to substantially prevent their shifting positions due to vibration or gravity, and an electrical system arranged for attachment to a source of electrical current and containing a switch connected to and controlling said electric light.

FRANCIS R. GOOD.

REFERENCES CITED

The following references are of record in the file of this patent:

UNITED STATES PATENTS

| Number | Name | Date |
|---|---|---|
| 1,007,760 | Williams | Nov. 7, 1911 |
| 1,254,924 | Miller | Jan. 29, 1918 |
| 1,450,732 | Mueller | Apr. 3, 1923 |
| 1,664,025 | Etheridge | Mar. 27, 1928 |
| 1,930,307 | Croes | Oct. 10, 1933 |
| 2,048,105 | Cobbs | July 21, 1936 |
| 2,454,722 | Slamka | Nov. 23, 1948 |

FOREIGN PATENTS

| Number | Country | Date |
|---|---|---|
| 204,288 | Great Britain | Sept. 27, 1923 |